United States Patent
Takahashi et al.

(10) Patent No.: US 9,722,284 B2
(45) Date of Patent: Aug. 1, 2017

(54) NONAQUEOUS SECONDARY BATTERY AND BATTERY CONTROL SYSTEM

(75) Inventors: Hirofumi Takahashi, Hitachi (JP); Kan Kitagawa, Hitachi (JP)

(73) Assignee: HITACHI, LTD., Tokyo (JP)

( * ) Notice: Subject to any disclaimer, the term of this patent is extended or adjusted under 35 U.S.C. 154(b) by 164 days.

(21) Appl. No.: 14/427,303

(22) PCT Filed: Sep. 12, 2012

(86) PCT No.: PCT/JP2012/073276
§ 371 (c)(1),
(2), (4) Date: Mar. 10, 2015

(87) PCT Pub. No.: WO2014/041622
PCT Pub. Date: Mar. 20, 2014

(65) Prior Publication Data
US 2015/0270583 A1    Sep. 24, 2015

(51) Int. Cl.
*H01M 10/48* (2006.01)
*H01M 4/136* (2010.01)
*H01M 10/42* (2006.01)
*H01M 10/0525* (2010.01)
*H01M 10/052* (2010.01)

(52) U.S. Cl.
CPC .......... *H01M 10/48* (2013.01); *H01M 4/136* (2013.01); *H01M 10/0525* (2013.01); *H01M 10/4242* (2013.01); *H01M 10/052* (2013.01); *Y02T 10/7011* (2013.01)

(58) Field of Classification Search
CPC ............. H01M 10/48; H01M 10/0525; H01M 10/4242; H01M 4/136
See application file for complete search history.

(56) References Cited

U.S. PATENT DOCUMENTS 7,846,571 B2 * 12/2010 Christensen ........ H01M 6/5005
429/142
2005/0244715 A1    11/2005 Cho et al.
(Continued)

FOREIGN PATENT DOCUMENTS

JP    2001-273899 A    10/2001
JP    2005-317551 A    11/2005
(Continued)

OTHER PUBLICATIONS

Machine translation of JP 2011-103178 A.*

*Primary Examiner* — Jonathan Jelsma
(74) *Attorney, Agent, or Firm* — Volpe and Koenig, P.C.

(57) ABSTRACT

A nonaqueous secondary battery includes an ion supply unit which supplies ions identical to ions in an electrolyte into the electrolyte at a reaction potential higher than the uncharged potential of a positive electrode. The ion supply unit includes an ion supply source which elutes the ions into the electrolyte by being in contact with the electrolyte in a state of being electrically connected to the positive electrode, and a first covering portion which covers at least a part of the ion supply source. Then, the first covering portion maintains the ion supply source and the positive electrode in an electrically disconnected state by being interposed between the ion supply source and the positive electrode, and is dissolved or disappears at the reaction potential.

14 Claims, 12 Drawing Sheets

(56) References Cited

U.S. PATENT DOCUMENTS

| | | | |
|---|---|---|---|
| 2006/0093871 A1* | 5/2006 | Howard | H01M 4/131 |
| | | | 429/9 |
| 2006/0110660 A1* | 5/2006 | Satou | H01M 4/045 |
| | | | 429/231.95 |
| 2006/0172180 A1* | 8/2006 | Okamura | H01M 4/13 |
| | | | 429/61 |
| 2006/0251967 A1 | 11/2006 | Goh | |
| 2008/0003490 A1 | 1/2008 | Christensen et al. | |
| 2010/0086843 A1 | 4/2010 | Kawai et al. | |
| 2010/0233543 A1 | 9/2010 | Numata et al. | |
| 2011/0111294 A1* | 5/2011 | Lopez | H01M 4/134 |
| | | | 429/217 |

FOREIGN PATENT DOCUMENTS

| | | |
|---|---|---|
| JP | 2008-084842 A | 4/2008 |
| JP | 2008-097991 A | 4/2008 |
| JP | 2008-192540 A | 8/2008 |
| JP | 2008-532224 A | 8/2008 |
| JP | 2008-300178 A | 12/2008 |
| JP | 2009-038036 A | 2/2009 |
| JP | 2009-543294 A | 12/2009 |
| JP | 2011-103178 A | 5/2011 |
| WO | 01/17046 A1 | 3/2001 |

* cited by examiner

NONAQUEOUS SECONDARY BATTERY AND BATTERY CONTROL SYSTEM

TECHNICAL FIELD

The present invention relates to a nonaqueous secondary battery, and for example, relates to a nonaqueous secondary battery such as a lithium ion secondary battery having a high energy density which is preferably used in portable equipment, an electric automobile, power storage, or the like, and a battery control system.

BACKGROUND ART

It has been known that in a lithium ion secondary battery using a carbon material as a negative electrode active material, a film is able to be formed on a negative electrode surface due to a side reaction according to a negative electrode charge reaction at the time of the first charge after the battery is manufactured. In addition, recently, it has been known that an alloy negative electrode active material or the like including silicon or tin which has been intensively studied as a negative electrode active material having high capacitance has a larger number of side reactions compared to the carbon material described above.

It has been known that lithium ions which are charged once are fixed into a negative electrode due to these side reactions, and thus all of the lithium ions are not able to be discharged, that is, irreversible capacitance occurs in which a part of the lithium ions charged in the negative electrode is not able to be discharged, and thus the capacitance of the entire battery decreases.

As the related art for solving this problem, a lithium secondary battery is disclosed in PTL 1, in which "at least one of a positive electrode, a negative electrode, and a separator includes an alkali metal powder layer formed on a surface thereof", and the alkali metal powder layer is formed by "a step of coating an alkali metal composition to a current collector on which a high molecular film or an active material layer is formed and a step of drying the coated high molecular film or current collector".

An object of the technology disclosed in PTL 1 is to provide "a lithium secondary battery exhibiting excellent energy density by decreasing the initial irreversible capacitance when the battery is charged and discharged". In addition, in PTL 2, a technology is disclosed in which "a lithium powder exists on a separator surface", and an object of this technology is to "obtain a nonaqueous electrolyte secondary battery having high initial efficiency and a high cycle retention rate".

Further, a technology is disclosed in which "a stabilized lithium powder of which a surface is coated with a substance having excellent environment stabilization, for example, organic rubber such as nitrile butadiene rubber (NBR) and styrene butadiene rubber (SBR), an organic resin such as an ethylene vinyl alcohol copolymer resin (EVA), an inorganic compound such as metal carbonate of $Li_2CO_3$ or the like, and the like" is used as the lithium powder. Further, an object of the technology is to provide a nonaqueous electrolyte secondary battery in which an added amount of lithium is determined "after the initial efficiency of the negative electrode is obtained", and thus "the lithium powder does not undergo metamorphosis even in a dry room at a temperature of approximately a dew point of −40° C.", and "lithium is not precipitated on the negative electrode or capacitance does not decrease due to the excessively increased added amount of lithium".

CITATION LIST

Patent Literature

PTL 1: JP-A-2005-317551
PTL 2: JP-A-2008-084842

SUMMARY OF INVENTION

Technical Problem

In the related art, an object of such an approach for supplying lithium is to resolve the initial irreversible capacitance of the positive electrode active material and/or the negative electrode active material.

However, it has been known that the side reaction occurs not only in an initial state, but also in a subsequent preservation state or a use state, and for example, occurs at the time of preservation under a comparatively high temperature environment or according to a plurality of charge and discharge cycles, and thus a phenomenon newly occurs in which the lithium ions are fixed into the negative electrode. As a result thereof, the potential of the positive electrode or the negative electrode is shifted to a high potential side, and thus capacitance degradation in the battery occurs due to a decrease of the charge and discharge range.

In addition, when lithium is directly supplied to the positive electrode by using the related art, the positive electrode and metal lithium are reacted before the initial charge, and thus the positive electrode is in an overdischarged state, and battery properties are degraded.

The present invention is made in consideration of the problems described above, and an object of the present invention is to provide a nonaqueous secondary battery in which a positive electrode is not overdischarged before the initial charge, and in which capacitance degradation due to a side reaction occurring at the time of preservation under a comparatively high temperature environment or according to use of the battery such as a plurality of charge and discharge cycles is able to be resolved, and a battery control system thereof.

Solution to Problem

The present invention includes a plurality of units for solving the problems described above, and as one example thereof, there is provided a nonaqueous secondary battery which includes a positive electrode, a negative electrode, and an electrolyte, and which ejects ions into the electrolyte from the positive electrode or the negative electrode or is charged and discharged by repeating an absorption reaction, and includes an ion supply unit which supplies ions identical to the ions in the electrolyte into the electrolyte at a reaction potential higher than the uncharged potential of the positive electrode.

Advantageous Effects of Invention

According to the present invention, it is possible to provide a nonaqueous secondary battery in which reaction time between the ion supply source and the positive electrode is controlled, and not only is initial irreversible capacitance able to be resolved, but also a capacitance degradation due to a side reaction occurring at the time of preservation under a comparatively high temperature environment or according to use of the battery such as a plurality of charge and discharge cycles is able to be resolved. Furthermore, problems other than the problems described above, and configurations and effects will become more obvious in the following description of embodiments.

DESCRIPTION OF EMBODIMENTS

Hereinafter, examples of the present invention will be described with reference to the drawings. Furthermore, in the following examples, as an application example of a nonaqueous secondary battery of the present invention, a lithium ion secondary battery will be described.

Example 1

Figure 1:
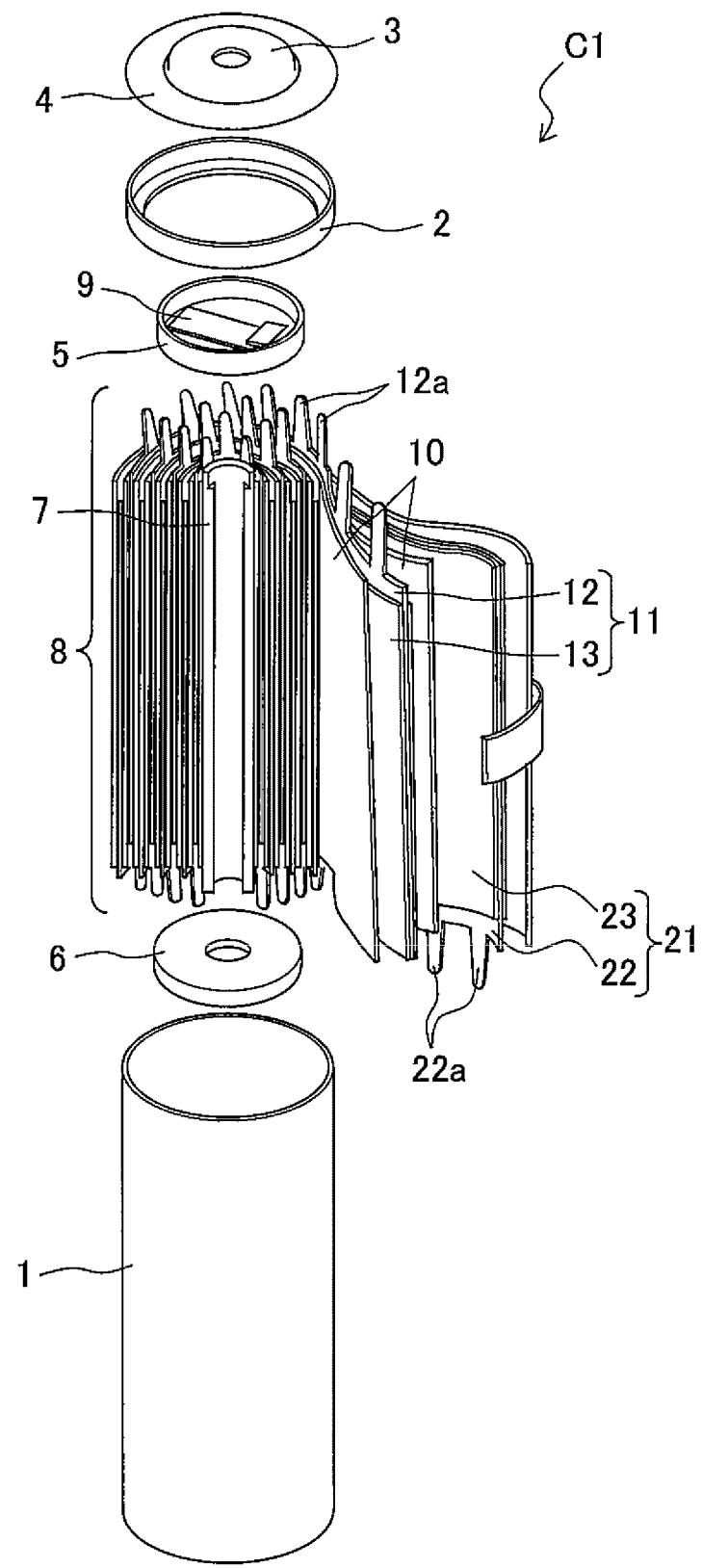
FIG. 1 is an exploded perspective view illustrating a lithium ion secondary battery of Example 1 in a partial cross-sectional view.

FIG. 1 is an exploded perspective view illustrating a configuration of the lithium ion secondary battery of this example in a partial cross-sectional view.

A lithium ion secondary battery C1, for example, is a winding type cylindrical lithium ion secondary battery which is mounted in a hybrid automobile, an electric automobile, and the like, and as illustrated in FIG. 1, has a configuration in which a winding type electrode group 8 is contained in a bottomed cylindrical battery can 1 having conductivity.

The electrode group 8 is configured by superposing a strip-like positive electrode 11 and a negative electrode 21 in the shape of a layer through a porous separator 10 having insulating properties, by being wound around an axial core 7 of a resin, and by fixing an outermost separator 10 thereon using tape.

The positive electrode 11 includes a positive electrode foil 12 formed of aluminum foil, and a positive electrode mixture layer 13 coated on both surfaces of the positive electrode foil 12. On the peripheral portion of the positive electrode foil 12 in an upper portion of the drawing, a plurality of positive electrode tabs 12a is disposed. The negative electrode 21 includes a negative electrode foil 22 formed of copper foil, and a negative electrode mixture layer 23 coated on both surfaces of the copper foil 22. On the peripheral portion of the negative electrode foil 22 in a lower portion of the drawing, a plurality of negative electrode tabs 22a is disposed.

A positive electrode collection plate 5 and a negative electrode collection plate 6 are fitted and fixed onto both ends of the tubular axial core 7. The positive electrode tab 12a, for example, is welded to the positive electrode collection plate 5 by an ultrasonic welding method. Similarly, the negative electrode tab 22a, for example, is welded to the negative electrode collection plate 6 by an ultrasonic welding method.

In an inner portion of the battery can 1 which also functions as a terminal of the negative electrode 21, the positive electrode collection plate 5 and the negative electrode collection plate 6 are contained by being attached to the electrode group 8 wound around the axial core 7 of a resin. At this time, an electrolytic solution which is an electrolyte is also injected into the battery can 1. The electrolytic solution is an organic electrolytic solution in which a salt including lithium is dissolved. In addition, a gasket 2 is disposed between the battery can 1 and the upper lid case, and an opening portion of the battery can 1 is sealed and electrically insulated by the gasket 2.

An upper lid portion 3 having conductivity is disposed on the positive electrode collection plate 5 such that the opening portion of the battery can 1 is sealed. The upper lid portion 3 is formed of an upper lid and an upper lid case. One side of a positive electrode lid 9 is welded to the upper lid case, and the other side of the positive electrode lid 9 is welded to the positive electrode collection plate 5, and thus the upper lid portion 3 and the positive electrode of the electrode group 8 are electrically connected to each other.

The positive electrode mixture layer 13 is formed of a positive electrode mixture including a positive electrode active material, a conductive agent, and a binding agent, and the negative electrode mixture layer 23 is formed of a negative electrode mixture including a negative electrode active material, a negative electrode binder resin, and a thickening agent. The positive electrode mixture layer 13 and the negative electrode mixture layer 23 are formed by preparing a dispersion solution of a substance configuring a mixture in the shape of slurry, by applying the slurry mixture onto metal foil, by drying the applied slurry mixture, and by pressing the dried slurry mixture.

As an example of the coating method, a slit die coating method, a roll coating method, and the like are able to be used. In addition, as a solvent of the dispersion solution, N-methyl pyrrolidone (NMP), water, and the like are able to be used. Further, as the drying method, hot air circulation, infrared heating, a hybrid method thereof, and the like are able to be included. As the pressing method, a method of performing compression from both surfaces of the electrode by using a columnar metal roller is included.

Figure 2:
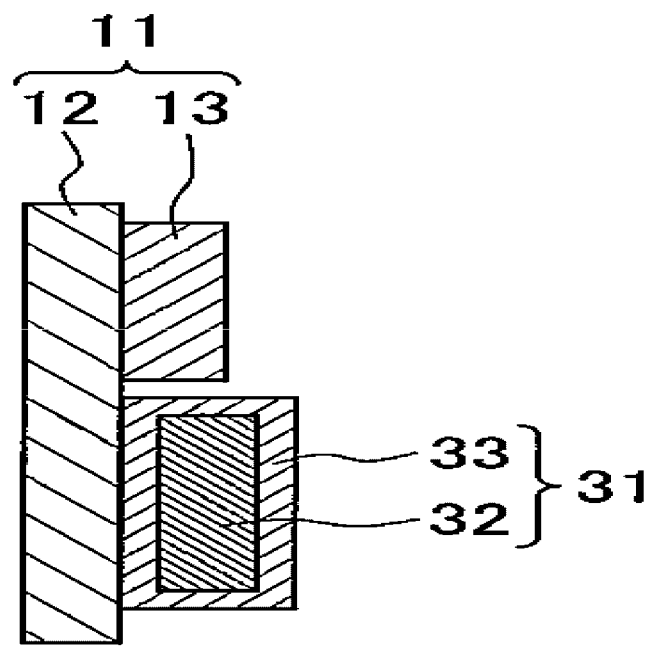
FIG. 2 is a cross-sectional view schematically illustrating a configuration example of a positive electrode and an ion supply unit of Example 1.

FIG. 2 is a cross-sectional view schematically illustrating a configuration of the positive electrode and the ion supply unit of this example.

An ion supply unit 31 is disposed in the positive electrode 11. The ion supply unit 31 has a configuration for supplying ions identical to ions in an electrolytic solution into the electrolytic solution at a reaction potential higher than the uncharged potential of the positive electrode 11. The ion supply unit 31, for example, includes an ion supply source 32 of metal ions or the like, and a soluble covering portion (a first covering portion) 33 which covers the ion supply source 32 and is dissolved at a predetermined oxidation reaction potential.

In this example, $LiCoO_2$ is used as the positive electrode active material of the positive electrode 11. Then, 7 wt % of acetylene black as a conductive agent, and 5 wt % of polyvinylidene fluoride (PVDF) as a binding agent were added to the positive electrode active material, and N-methyl-2-pyrrolidone was added thereto and mixed, and thus a positive electrode slurry mixture was prepared. The positive electrode slurry mixture was applied onto both surfaces of the positive electrode foil 12 which was aluminum foil having a thickness of 25 μm (in FIG. 2, only one side is illustrated), and was dried, then pressed and cut, and thus the positive electrode mixture was bound to both surfaces of the positive electrode foil 12, and the positive electrode mixture layer 13 was formed and set to be the positive electrode 11.

Similarly, hardly graphitizable carbon is used as the negative electrode active material of the negative electrode 21. Then, 8 wt % of PVDF as a binding agent was added to the negative electrode active material, and N-methyl-2-pyrrolidone was added thereto and mixed, and thus a negative electrode slurry mixture was prepared. The negative electrode slurry mixture was applied onto both surfaces of the negative electrode foil 22 which was copper foil having a thickness of 10 μm, and was dried, then pressed and cut, and thus the negative electrode mixture was bound to both surfaces of the negative electrode foil 22, and the negative electrode mixture layer 23 was formed and set to be the negative electrode 21.

Figure 3:
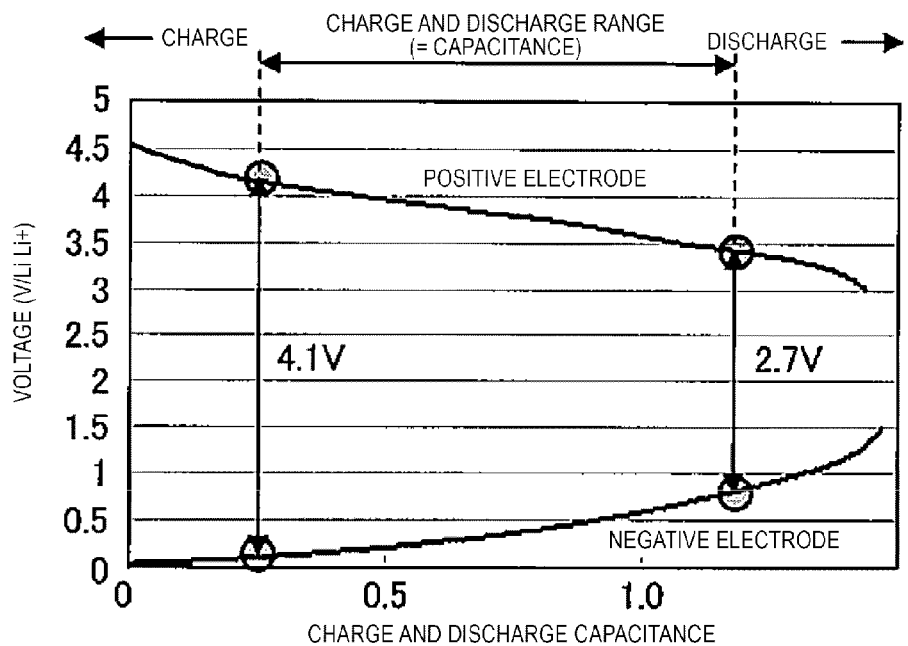
FIG. 3 is a graph illustrating a charge and discharge curve before capacitance degradation in a lithium ion secondary battery occurs.
Figure 4:
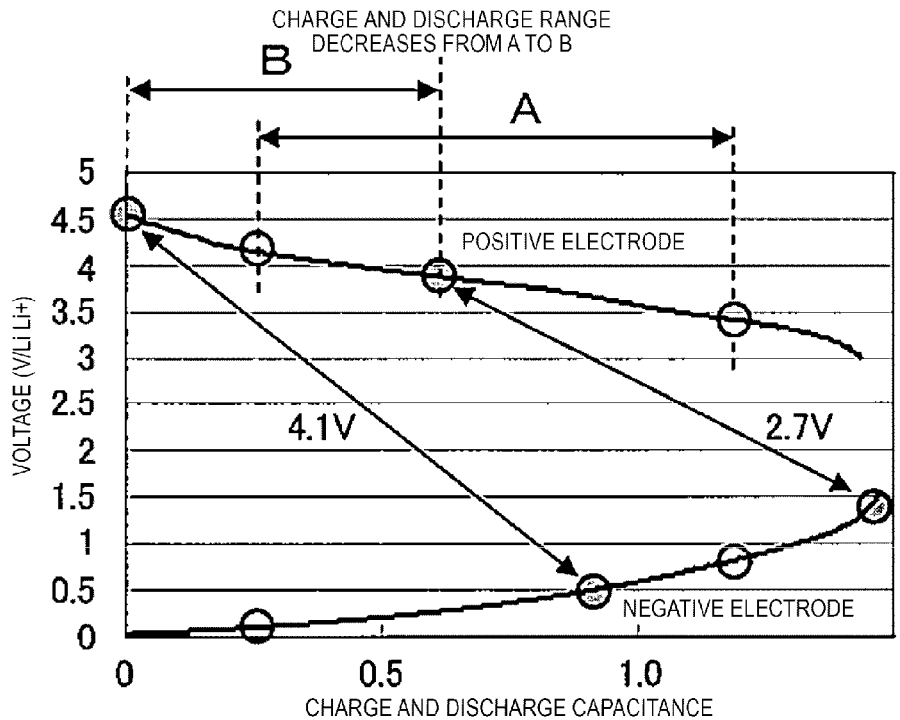
FIG. 4 is a graph illustrating a charge and discharge curve after the capacitance degradation in the lithium ion secondary battery occurs.

FIG. 3 is a graph illustrating a charge and discharge curve of the positive electrode and the negative electrode before capacitance degradation in the lithium ion secondary battery occurs, and FIG. 4 is a graph illustrating a charge and discharge curve of the positive electrode and the negative electrode after the capacitance degradation in the lithium ion secondary battery occurs according to the preservation state or the use state thereof.

The positive electrode 11 in this example has a potential of 3.0 V to 3.1 V based on metal lithium in an uncharged state. In addition, in an ordinary use range before capacitance degradation occurs, the potential is utilized by being increased up to approximately 4.1 V to 4.3 V at the time of charging.

In the ion supply source 32, approximately 1 mm square of metal lithium was used. In the covering portion 33, the copper foil which was used as the negative electrode foil 22 of the electrode group 8 was used. The covering portion 33 was formed by processing the copper foil into the shape of a pouch in advance, contained the ion supply source 32 under an inert gas atmosphere, and was sealed. It is known that copper configuring the covering portion 33 is dissolved at an oxidation reaction potential of 3.3 V to 3.5 V based on metal lithium. The covering portion 33 covers the entire surface of the ion supply source 32, and maintains the ion supply source 32 and the positive electrode 11 in an electrically connected state, and the ion supply source 32 and the electrolytic solution in a non-contact state.

The ion supply unit 31 was fixed to an exposed portion of the positive electrode foil 12 with tape having electrolyte resistance (not illustrated) or the like. The ion supply source 32 is sealed by the covering portion 33 in an uncharged state, and thus does not react with the positive electrode 11, and lithium ions are not supplied to the positive electrode 11 from the ion supply unit 31. Therefore, the covering portion 33 functions as a barrier film having potential resistance, and a reaction between the metal lithium and the positive electrode is able to be prevented in an uncharged state, and thus the positive electrode 11 is not overdischarged before the initial charge unlike in a case where the metal lithium is simply added to the positive electrode.

Then, the potential was increased more than the oxidation reaction potential (3.3 V to 3.5 V) of copper during the initial charge, the covering portion 33 of the ion supply unit 31 was dissolved, the ion supply source 32 was in contact with the electrolytic solution in a state of being electrically connected to the positive electrode 11, a reaction between the positive electrode 11 and the ion supply source 32 (the metal lithium) was initiated, and the lithium ions were supplied to the positive electrode 11 from the ion supply source 32, and thus irreversible capacitance due to an initial side reaction of the negative electrode 21 was able to be resolved.

In addition, as another configuration example of the covering portion 33, a case where a covering layer is formed by vapor depositing silver on an outer surface of the ion supply source 32 instead of the copper foil, and similarly, is added to the positive electrode 11 is described. Here, the initial charge was performed up to 3.6 V, which is lower than the oxidation reaction potential (3.8 V) of silver such that the covering layer was not dissolved at the time of the initial charge, and storage was performed at 60° C. for 2 days as preservation under a high temperature environment.

After that, the charge was performed up to 4.1 V which was the oxidation reaction potential, and thus the covering layer was dissolved and was in contact with the electrolytic solution in a state where the ion supply source 32 was electrically connected to the positive electrode 11, and the ion supply unit 31 was operated. As a result thereof, a capacitance degradation existence state illustrated in FIG. 4 did not occur, but a capacitance degradation non-existence state illustrated in FIG. 3 was able to occur, and thus capacitance degradation due to a side reaction which progressed due to the preservation under a comparatively high temperature environment was able to be resolved.

Therefore, a reaction time between the ion supply source 32 and the positive electrode 11 was controlled, and thus not only was initial irreversible capacitance able to resolved, but also the capacitance degradation due to the side reaction which progressed at the time of the preservation under the comparatively high temperature environment or according to use of the battery, for example, during a plurality of charge and discharge cycles, was able to be resolved.

Here, as a material of the covering portion 33, a material having a desired oxidation reaction potential may be used, and a material is able to be selected from known materials according to the battery design. Among pure metals, for example, silver (3.8 V), palladium (4.0 V), gold (4.5 V), and the like are known. In addition, as the covering portion 33, stainless steel or an alloy having a desired oxidation reaction potential may be used. Stainless steel is more preferable because stainless steel has high oxidation resistance, and thus for example, due to an instantaneous increase in a positive electrode potential at the time of initiating the charge, or the like, unintended operation of the ion supply source is able to be prevented.

As a forming method of the covering portion 33, a method of processing foil into the shape of a pouch, vacuum vapor deposition, electrolytic plating, electroless plating, and the like are able to be used. In addition, in the ion supply source 32, a negative electrode material including lithium is able to be used, and a material having high capacitance is preferable, and thus it is preferable that an alloy-based negative electrode including metal lithium, or silicon or tin and lithium, and the like are used.

Example 2

Next, Example 2 will be described with reference to FIG. 5.

Figure 5:
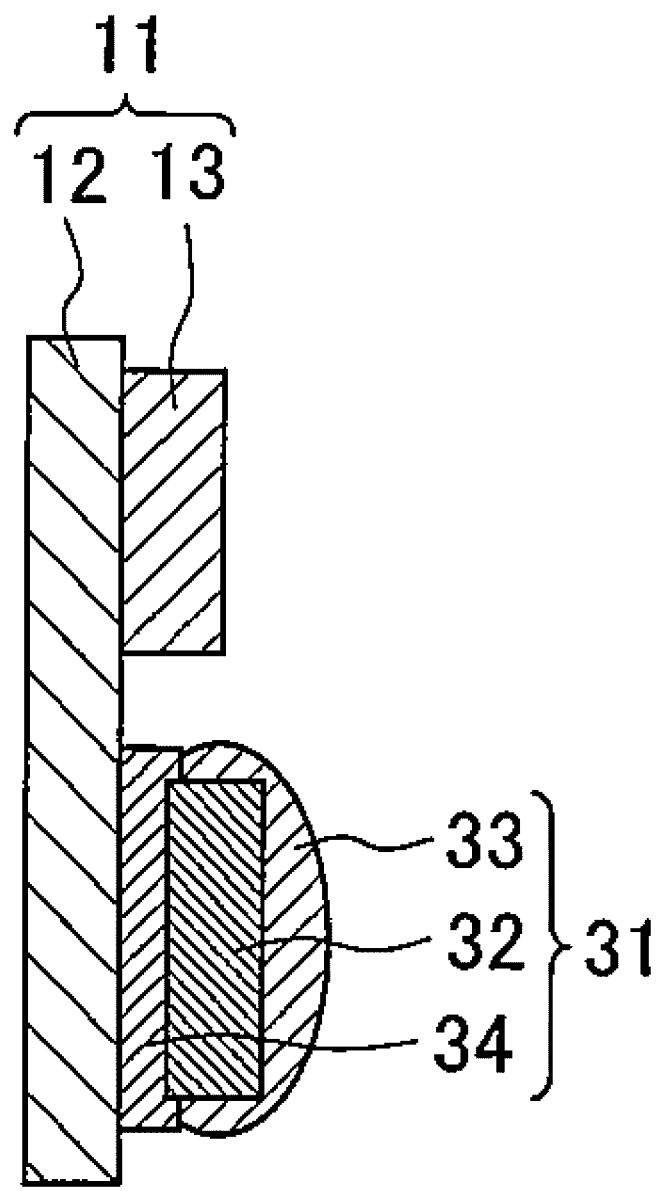
FIG. 5 is a cross-sectional view schematically illustrating a configuration example of a positive electrode and an ion supply unit of Example 2.

FIG. 5 is a cross-sectional view schematically illustrating the configuration of a positive electrode and an ion supply unit of this example. Furthermore, the same reference numerals are applied to the same constituent elements as those in Example 1, and thus the detailed description thereof will be omitted.

In a characteristic configuration of this example, an undissolved conductive portion 34 is disposed in a portion interposed between the ion supply unit 31 and the positive electrode foil 12, and thus electrical connection between the ion supply unit 31 and the positive electrode foil 12 is stably ensured. The covering portion 33 partially covers the ion supply source 32, maintains the ion supply source 32 and the electrolytic solution in a non-contact state, and is dissolved at a reaction potential. The covering portion 33 covers an exposed portion of the outer surface of the ion supply source 32 which remains without being covered with the conductive portion 34.

The conductive portion 34 is interposed between the ion supply source 32 and the positive electrode foil 12 and electrically connects the ion supply source 32 and the positive electrode foil 12, and has a reaction potential higher than the reaction potential of the covering portion 33. The conductive portion 34 is not dissolved even when the potential increases and reaches the reaction potential of the covering portion 33, and thus it is possible to stably ensure an electrically connected state between the ion supply source 32 and the positive electrode foil 12. In this example, as the conductive portion 34, the aluminum foil configuring the positive electrode foil 12 is used.

The ion supply unit 31 is obtained by pressing and adhering the ion supply source 32 to the conductive portion 34, and after that, is obtained by vacuum vapor depositing silver on the exposed portion of the ion supply source 32, and by forming the covering layer which is the covering portion 33.

The ion supply unit 31 brought the conductive portion 34 into closely and electrically contact with the positive electrode foil 12 and fixed the conductive portion 34 to the positive electrode foil 12. Then, the initial charge was performed up to approximately 3.6 V which was lower than the oxidation reaction potential (3.8 V) of silver such that the covering layer was not dissolved at the time of the initial charge, and storage was performed at 60° C. for 2 days as preservation under a high temperature environment.

After that, the charge was performed up to 4.1 V which was higher than the oxidation reaction potential of silver, and thus the covering layer was dissolved, the ion supply source 32 was exposed, and the ion supply unit 31 was operated. As a result, the capacitance degradation existence state illustrated in FIG. 4 did not occur, but the capacitance degradation non-existence state illustrated in FIG. 3 was able to occur, and thus capacitance degradation due to the side reaction which progressed due to the preservation under a comparatively high temperature environment was able to be resolved.

According to this configuration, aluminum foil which is stable in an environment where the positive electrode 11 is positioned is formed as the conductive portion 34 in a portion in contact with the positive electrode 11, and thus conduction between the positive electrode 11 and the aluminum foil is preferably performed. In addition, it is possible to reduce the area of the covering portion 33 in the battery C1 compared to Example 1.

Figure 6:
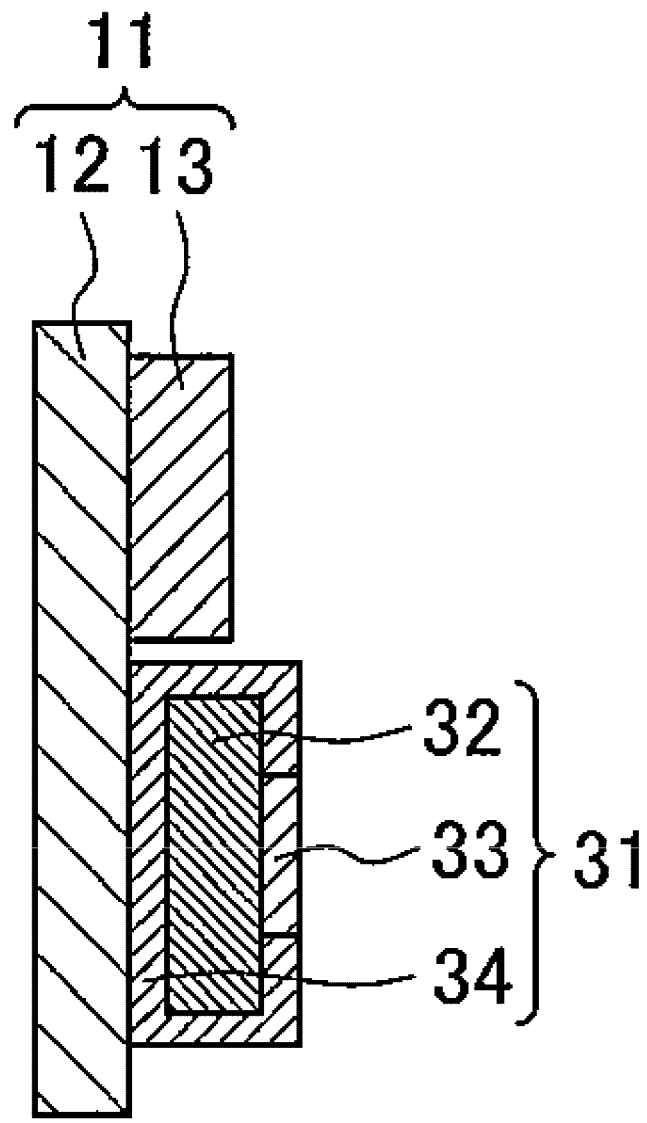
FIG. 6 is a cross-sectional view schematically illustrating another configuration example of the positive electrode and the ion supply unit of Example 2.

FIG. 6 is a cross-sectional view schematically illustrating another configuration example of the positive electrode and the ion supply unit of this example.

The ion supply unit 31 is able to be prepared by performing two-stage electrolytic plating or electroless plating using the conductive portion 34 and the covering portion 33. For example, as illustrated in FIG. 6, an aluminum layer which is the conductive portion 34 is formed on the outer surface of the ion supply source 32 in advance through primary electrolytic or electroless plating, at this time, and a pit or a pinhole which communicates with the ion supply source 32 is formed in the aluminum layer. Then, the covering layer 33 is formed through secondary electrolytic or electroless plating such that the pit or the pinhole formed in the aluminum layer is covered with the covering portion 33, and thus it is possible to prepare the ion supply unit 31. Accordingly, it is possible to further reduce the area of the covering portion 33 in the battery C1, and thus it is more preferable.

Figure 7:
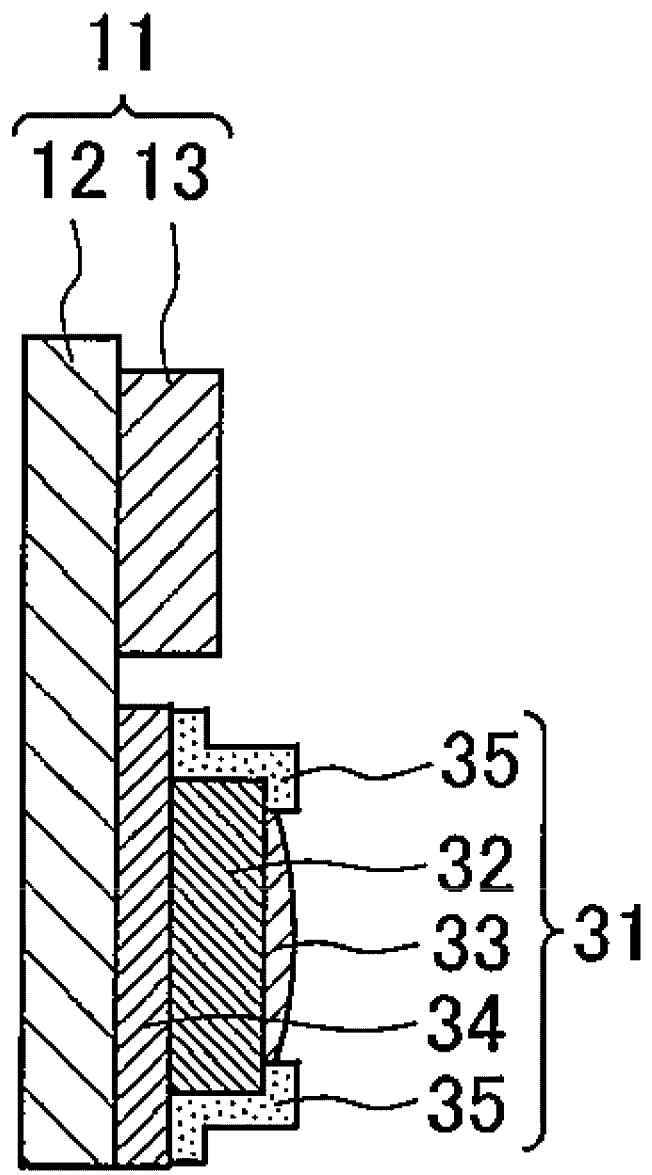
FIG. 7 is a cross-sectional view schematically illustrating still another configuration example of the positive electrode and the ion supply unit of Example 2.

FIG. 7 is a diagram illustrating still another specific example of this example.

In the ion supply unit 31, as illustrated in FIG. 7, a part of the surface of the ion supply source 32 is covered with the soluble covering portion 33, and the surface on the positive electrode foil 12 side is covered with the conductive portion 34 of aluminum or the like which has conductivity. Then, the other exposed portion is covered with an insoluble covering portion (a second covering portion) 35 such as a resin sheet or an adhesive resin tape.

A part of the surface of the ion supply source 32 is covered with the soluble covering portion 33, and the remaining part is covered with the conductive portion 34 and the insoluble covering portion 35. The covering portion 35 partially covers the ion supply source 32, maintains the ion supply source 32 and the electrolytic solution in a non-contact state, and has a reaction potential higher than the reaction potential of the soluble covering portion (the first covering portion) 33. The covering portion 35 is formed of a resin.

According to this configuration, similarly to in the specific example illustrated in FIG. 6, it is possible to reduce the area of the covering portion 33 in the battery C1, and thus it is more preferable. In addition, large equipment such as a plating device is not necessary compared to the specific example illustrated in FIG. 7, and thus it is possible to make the manufacturing thereof simple.

In the configuration of Example 1 or 2 described above, the surface of the ion supply source 32 such as metal lithium is covered with the covering portion 33, the conductive portion 34, or the like, and thus is protected from the outside. Therefore, for example, reactivity with respect to oxygen or moisture is lower than that in a state where the surface of the ion supply source 32 such as metal lithium is exposed, and the ion supply source 32 is easily handled, and thus it is preferable.

Example 3

Next, Example 3 will be described with reference to FIG. 8.

This example is identical to Example 1 except for the configuration of the ion supply unit.

Figure 8:
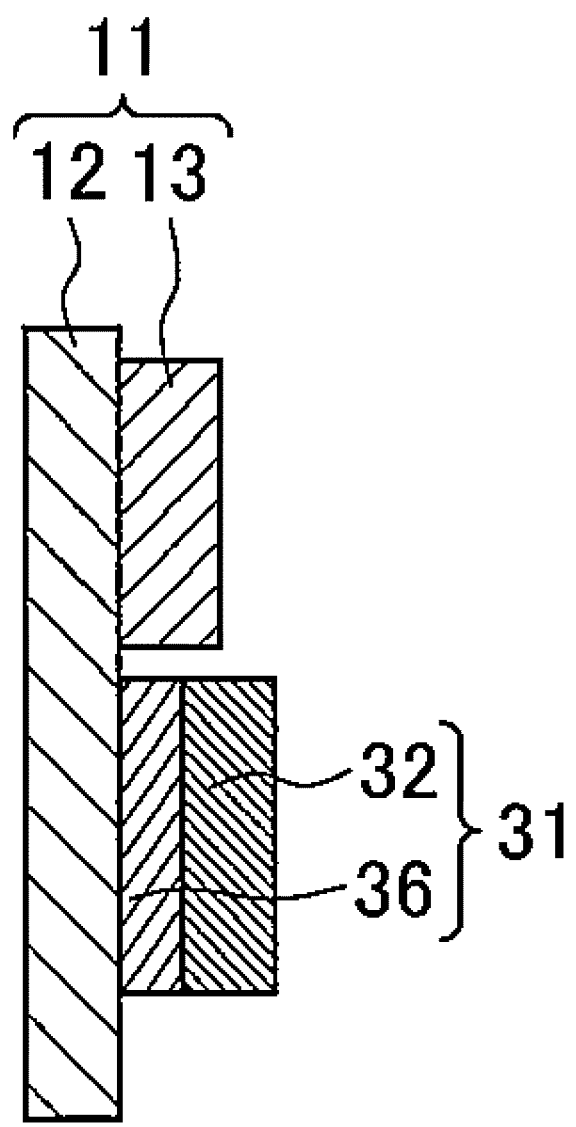
FIG. 8 is a cross-sectional view schematically illustrating a configuration example of a positive electrode and an ion supply unit of Example 3.

FIG. 8 is a cross-sectional view schematically illustrating a configuration of a positive electrode and an ion supply unit of this example. Furthermore, the same reference numerals are applied to the same constituent elements as those in Example 1, and thus the detailed description thereof will be omitted.

In a characteristic configuration of this example, an electrolytic covering portion (a first covering portion) 36 which is disposed between the ion supply source 32 and the positive electrode foil 12 and sets the ion supply source 32 and the positive electrode foil 12 in an electrically disconnected state, and is electrolyzed and disappears at the time of overcharge is disposed. The covering portion 36 was formed by mixing lithium carbonate with polyvinylidene fluoride (PVDF) which is a positive electrode binding agent.

In the lithium ion secondary battery, lithium carbonate is generally used as a battery inner pressure increasing agent which is electrolyzed and disappears at the time of the overcharge and generates carbonic acid gas. According to this configuration, the covering layer 36 of highly resistive lithium carbonate is disposed between the ion supply source 32 and the positive electrode foil 12 in a normal state, and when a side reaction of the negative electrode 21 progresses and a positive electrode potential is increased up to a reaction potential, the covering layer 36 is electrolyzed and disappears, and thus the positive electrode foil 12 and the ion supply source 32 become in contact with each other, and the ion supply unit 31 is able to be operated. Therefore, it is possible to resolve capacitance degradation due to the side reaction of the negative electrode 21.

Here, the covering layer 36 does not cover the entire surface of the ion supply source 32, but only a part thereof, and thus the amount of lithium carbonate to be electrolyzed is not excessive, and it is possible to prevent an unnecessary increase in an inner pressure of the battery C1.

Figure 9:
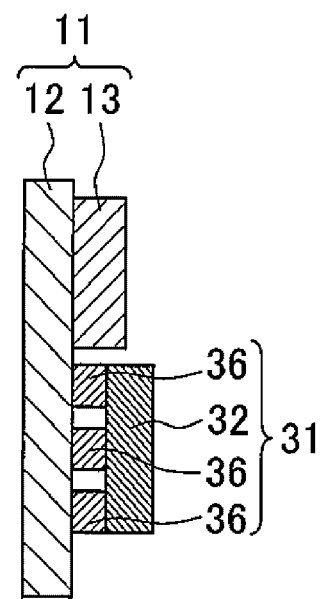
FIG. 9 is a cross-sectional view schematically illustrating another configuration example of the positive electrode and the ion supply unit of Example 3.

In addition, the configuration of the covering layer 36 is not limited to the configuration in which the covering layer 36 is disposed over the entire surface between the positive electrode foil 12 and the ion supply source 32, but the covering layer 36 may be disposed to ensure adhesion between the positive electrode foil 12 and the ion supply source 32, and for example, as illustrated in FIG. 9, may be disposed in the shape of an island having an interval set in advance. Thus, the covering layer 36 is disposed in the shape of an island, and it is possible to reduce the amount of lithium carbonate in the battery C1, and thus it is more preferable.

As described above, the covering layer 36 which has high resistance and an oxidation reaction potential higher than the potential of the positive electrode 11 in an uncharged state electrically separates the positive electrode 11 from the ion supply source 32, and thus the ion supply source 32 is not operated, and it is not necessary to densely cover the surface of the ion supply source 32, and thus it is preferable.

In such a covering layer 36, an oxide such as lithium carbonate, lithium oxide, lithium peroxide, and manganese dioxide, and a carbonate are able to be used. In particular, lithium carbonate is known as an additive material which is combined with a current blocking unit and reliably blocks a current according to an increase in the inner pressure thereof, and lithium oxide and lithium peroxide are by-products of a lithium air battery and are able to stably exist in the battery, and thus it is preferable.

Example 4

This example is identical to Example 1 except for the configuration of the positive electrode mixture layer 13.

$LiFePO_4$ was used as the positive electrode active material of the battery C1, 10 wt % of acetylene black as a conductive agent and 7.5 wt % of modified polyacrylonitrile as a binding agent were added, and N-methyl-2-pyrrolidone was also added thereto and mixed, and thus the positive electrode slurry mixture was prepared.

The positive electrode 11 in this example has a potential of 3.0 V to 3.1 V based on metal lithium in an uncharged state. In addition, in an ordinary use range before capacitance degradation occurs, the potential is utilized by being increased up to approximately 4.1 V to 4.3 V at the time of charging.

The ion supply source having the configuration illustrated in FIG. 2 was adhered to the exposed portion of the positive electrode foil 12 with tape having electrolyte resistance. Accordingly, unlike the case where the metal lithium was simply added to the positive electrode, the positive electrode was not overdischarged before the initial charge, and the positive electrode reacted with the metal lithium during the initial charge, and thus it was possible to resolve initial irreversible capacitance of the negative electrode.

It is known that $LiFePO_4$ is denoted by a general formula of $LiMPO_4$ (M includes at least one of Fe, Mn, Co, and Ni), is a positive electrode active material referred to as olivine type lithium phosphate, and has high overcharge resistance. By using an active material having high overcharge resistance in an active material of the positive electrode mixture, it is possible to suppress degradation or abnormal heating of the battery C1, or the like at the time of operating the ion supply unit 31 by intentionally setting the battery C1 to be in an overcharged state in the present invention where the ion supply unit 31 is operated by using the potential of the positive electrode, and thus it is more preferable.

Example 5

In this example, a control system of the lithium ion secondary battery illustrated in Examples 1 to 4 will be described.

Figure 10:
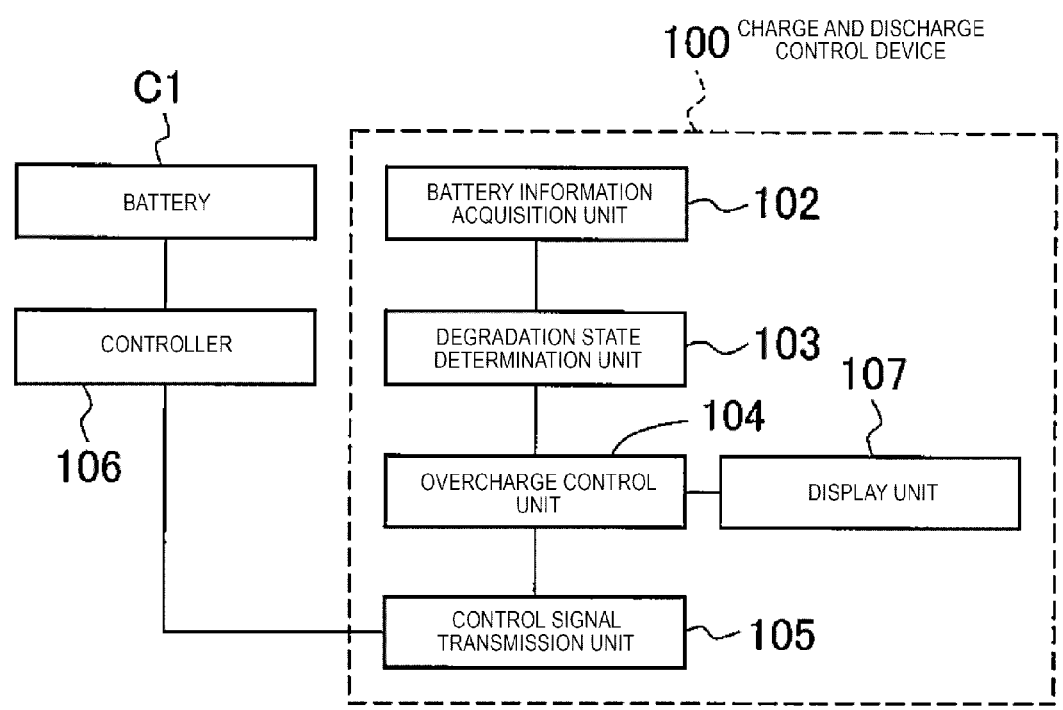
FIG. 10 is a configuration diagram of a battery control system which carries out a charge and discharge control method of this embodiment.
Figure 11:
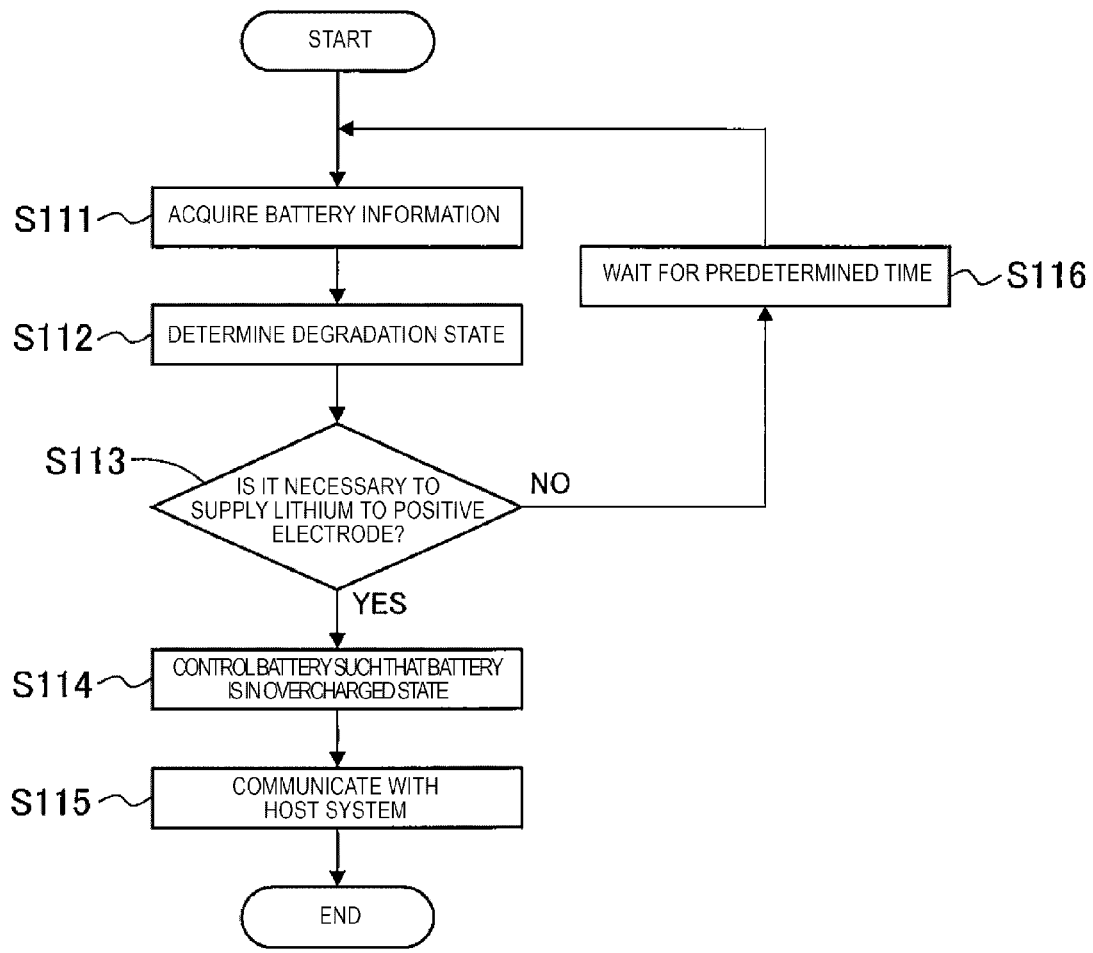
FIG. 11 is a flowchart illustrating the charge and discharge control method of this embodiment.

FIG. 10 is a system configuration diagram of a control system of the lithium ion secondary battery, and, FIG. 11 is a flowchart illustrating a control algorithm.

As illustrated in FIG. 11, the control system of the lithium ion secondary battery C1 includes a controller 106, and a charge and discharge control device 100. The charge and discharge control device 100 includes a battery information acquisition unit 102, a degradation state determination unit 103, an overcharge control unit 104, a control signal transmission unit 105, and a display unit 107.

The battery information acquisition unit 102 acquires charge and discharge information of the lithium ion secondary battery C1, and the degradation state determination unit 103 determines whether or not the ion supply unit 31 is operated on the basis of the state of the capacitance degradation of the lithium ion secondary battery C1. The overcharge control unit 104 determines an upper limit voltage of the overcharge and an overcharge maintaining time. The control signal transmission unit 105 transmits control information of the overcharge control unit 104 to the controller 106, and the display unit displays the information relevant to overcharge control. The controller 106 controls the lithium ion secondary battery such that the lithium ion secondary battery is in an overcharged state on the basis of the control information of the overcharge control unit 104.

Next, an operation of the control system having the configuration described above will be described.

First, the charge and discharge information of the lithium ion secondary battery C1 is acquired by a battery information acquisition unit 302 (Step S111). Then, the state of the capacitance degradation of the lithium ion secondary battery C1 is determined by the degradation state determination unit 103 (Step S112), and it is determined that whether or not it is necessary to supply lithium ions to the positive electrode 11 (Step S113).

Then, when it is determined that it is necessary to supply the lithium ions (YES in Step S113), the lithium ion secondary battery C1 is able to be controlled such that the lithium ion secondary battery C1 is in an overcharged state, and the upper limit voltage of the overcharge and the overcharge maintaining time are determined by the overcharge control unit 104 (Step S114). Then, the control information is transmitted to the controller 106 by allowing the control signal transmission unit 105 to communicate with a host system (Step S115). Then, the battery C1 is controlled by the controller 106 such that the battery C1 is in an overcharged state, and thus the ions are supplied to the positive electrode 11. The overcharge control unit 104 transmits the information relevant to the overcharge control to the display unit 307 in order to display the information, and thus the information is transmitted to the host system or a user.

It is possible to more precisely control the operation of the ion supply unit 31 by the control method described in this example. A criterion of determining whether or not the ion supply unit 31 is operated may be a case where battery capacitance is lower than a value set in advance, a case where a charge and discharge range of the positive electrode and the negative electrode is assumed from analysis of a charge and discharge curve and an upper limit value of an operation potential of the positive electrode exceeds a value set in advance, or the like.

It is known that the olivine material used in the positive electrode of Example 4 is a material having excellent stability at the time of the overcharge, and is a material which is easily used with the control method described in this example. For example, by using the lithium ion secondary battery C1 provided with a plurality of ion supply units 31 using covering materials having different oxidation reaction potentials, the upper limit voltage of the overcharge output by the overcharge control unit 104 gradually increases, and thus it is possible to operate the ion supply unit 31 a plurality of times.

When the charge and discharge control described in this example is not performed, and the charge and discharge curve is changed from that shown in FIG. 4 to that shown in FIG. 5, a soluble covering portion having an oxidation reaction potential is used in a potential region where a charge upper limit voltage of the positive electrode increases, and thus it is possible to autonomously operate the ion supply unit 31 with a single battery.

In the examples described above, a case where metal lithium of approximately 1 mm is used by being in contact with the exposed portion of the positive electrode foil 12 is described. A specific configuration example in which the configuration described above is applied to the winding type cylindrical lithium ion battery C1 is illustrated in FIG. 12 and FIG. 13.

Figure 12:
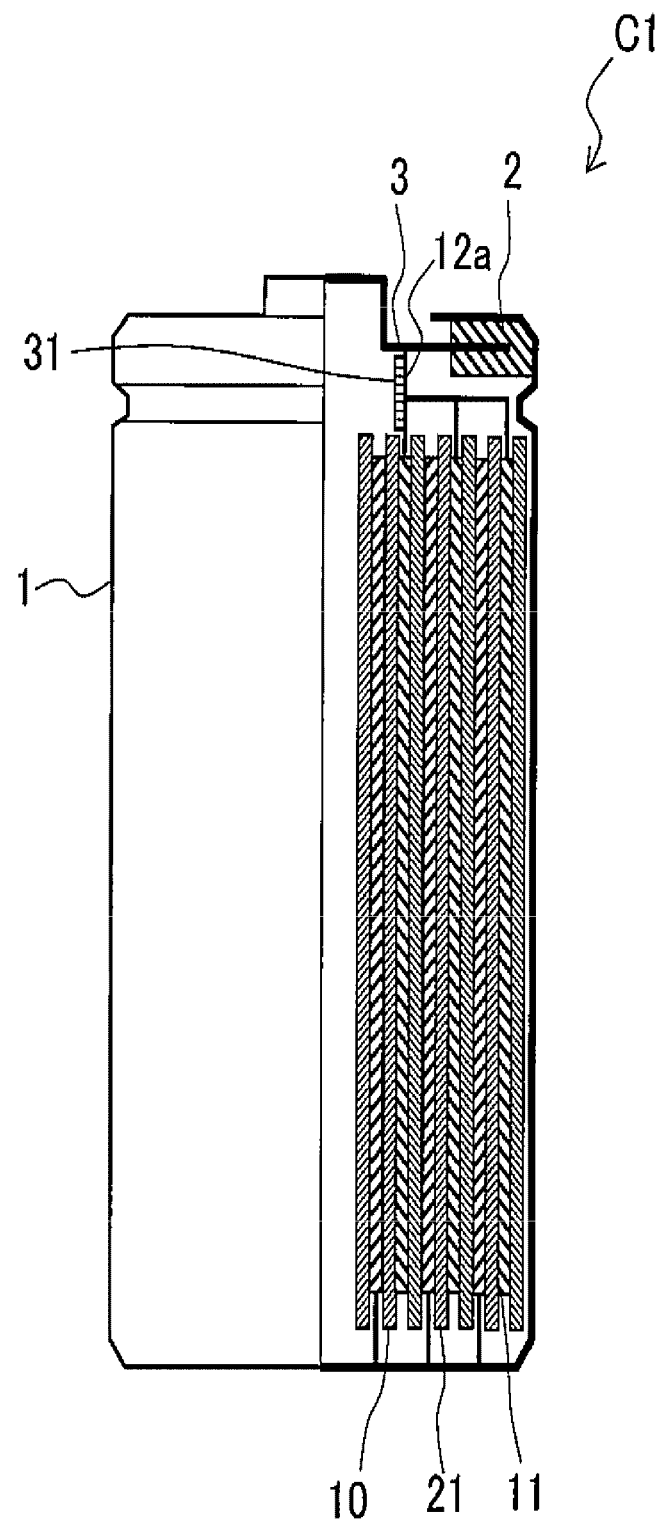
FIG. 12 is a cross-sectional view of a winding type cylindrical lithium ion secondary battery in which one ion supply unit is disposed.

In the configuration example illustrated in FIG. 12, one ion supply unit 31 is disposed on the positive electrode tab 12a of the positive electrode foil 12. In the configuration example illustrated in FIG. 13, a plurality of ion supply units 31 is disposed on the surface of the positive electrode foil 12 in a winding axis direction at predetermined intervals.

Figure 13:
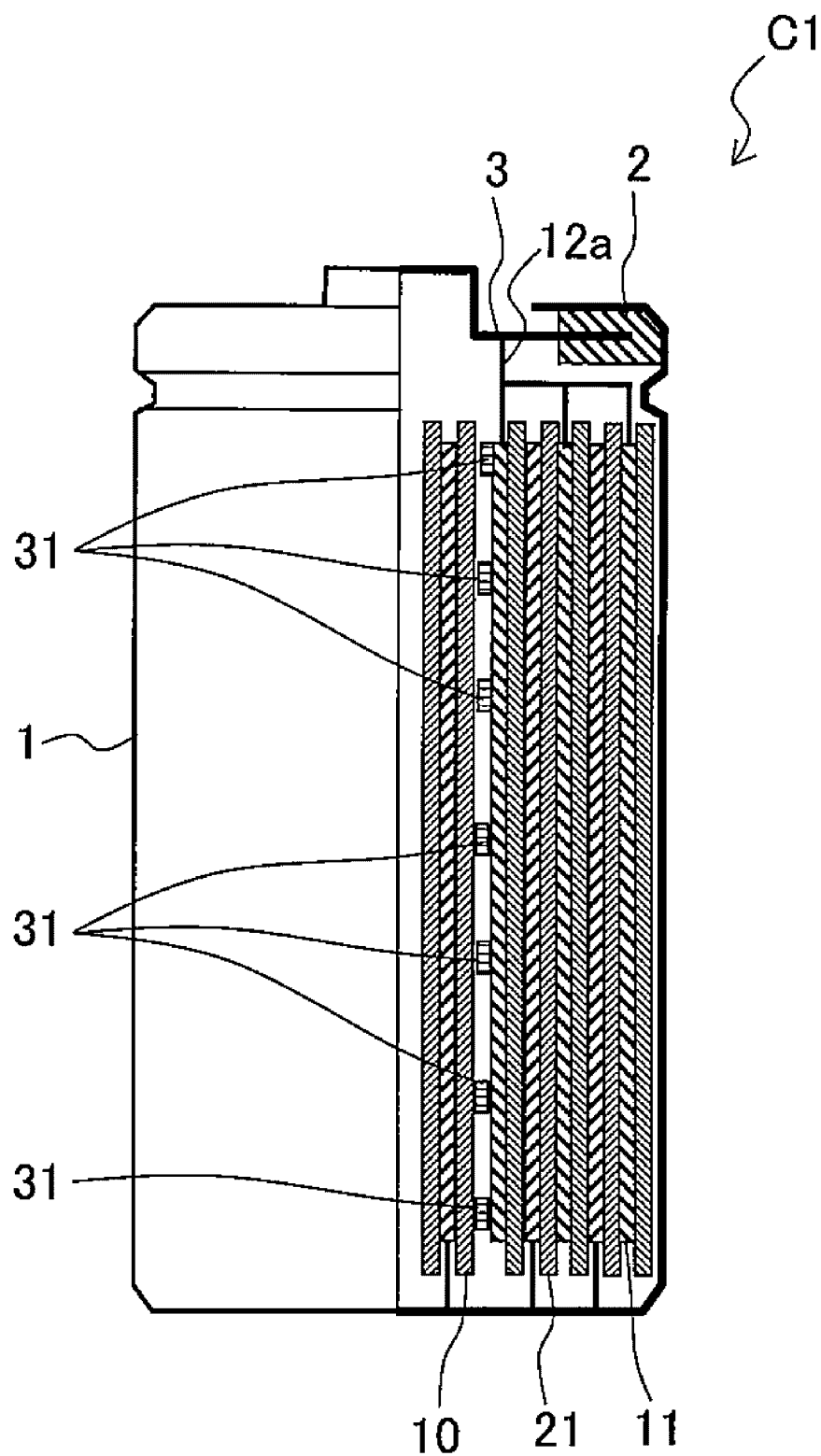
FIG. 13 is a cross-sectional view of a winding type cylindrical lithium ion secondary battery in which a plurality of ion supply units is disposed.

As illustrated in FIG. 13, when the plurality of ion supply units 31 is used by being dispersed in the positive electrode or on the surface of the positive electrode, an ion supply effect is uniformly obtained in the entire positive electrode, and thus it is preferable. At this time, it is more preferable that each of the ion supply units 31 has approximately the same diameter in consideration of the thickness of the positive electrode mixture layer 13 or the separator 10. In FIG. 13, in order to avoid complexity, a state is illustrated in which the ion supply unit is dispersed and arranged on only a part of the surface of the positive electrode 100, and the ion supply unit may be arranged on the positive electrode or on the entire surface thereof.

According to the present invention, the covering portion covering the surface of the ion supply source functions as a barrier film having potential resistance, and a reaction between the metal lithium and the positive electrode is able to be prevented in an uncharged state, and thus the positive electrode is not in an overdischarged state. In addition, when the potential reaches a reaction potential intrinsic to a material due to the charge, the covering portion is dissolved or disappears, and the ion supply source is electrically connected to the positive electrode and is in contact with the electrolyte by being exposed to the electrolyte, and thus it is possible to initiate a reaction between the ion supply source and the positive electrode.

REFERENCE SIGNS LIST

1 BATTERY CAN
2 GASKET
3 UPPER LID PORTION
5 POSITIVE ELECTRODE COLLECTION PLATE
6 NEGATIVE ELECTRODE COLLECTION PLATE
7 AXIAL CORE
8 ELECTRODE GROUP
11 POSITIVE ELECTRODE
12 POSITIVE ELECTRODE FOIL
13 POSITIVE ELECTRODE MIXTURE LAYER
21 NEGATIVE ELECTRODE
22 NEGATIVE ELECTRODE FOIL
23 NEGATIVE ELECTRODE MIXTURE LAYER
31 ION SUPPLY UNIT
32 ION SUPPLY SOURCE
33 SOLUBLE COVERING PORTION
34 CONDUCTIVE PORTION
35 INSOLUBLE COVERING PORTION
36 ELECTROLYTIC COVERING PORTION
100 CHARGE AND DISCHARGE CONTROL DEVICE
102 BATTERY INFORMATION ACQUISITION UNIT
103 DEGRADATION STATE DETERMINATION UNIT
104 OVERCHARGE CONTROL UNIT
105 CONTROL SIGNAL TRANSMISSION UNIT
106 CONTROLLER
107 DISPLAY UNIT
C1 LITHIUM ION SECONDARY BATTERY

The invention claimed is:

1. A nonaqueous secondary battery which includes a positive electrode, a negative electrode, and an electrolyte, and ejects ions into the electrolyte from the positive electrode or the negative electrode or is charged and discharged by repeating an absorption reaction, the nonaqueous secondary battery, comprising:
   an ion supply unit which supplies ions identical to the ions in the electrolyte into the electrolyte at a reaction potential higher than an uncharged potential of the positive electrode,
   wherein the ion supply unit includes:
   an ion supply source which elutes the ions identical to the ions in the electrolyte into the electrolyte by being in contact with the electrolyte in a state of being electrically connected to the positive electrode, and
   a first covering portion which covers at least a part of the ion supply source, maintains the ion supply source and the positive electrode in an electrically disconnected state by being interposed between the ion supply source and the positive electrode or maintains the ion supply source and the electrolyte in a non-contact state by being interposed between the ion supply source and the electrolyte, and is dissolved or disappears at the reaction potential.

2. The nonaqueous secondary battery according to claim 1,
   wherein the first covering portion covers an entire surface of the ion supply source, maintains the ion supply source and the positive electrode in the electrically connected state and the ion supply source and the electrolyte in the non-contact state, and is dissolved at the reaction potential.

3. The nonaqueous secondary battery according to claim 1,
   wherein the ion supply unit includes a conductive portion which electrically connects the ion supply source and the positive electrode by being interposed between the ion supply source and the positive electrode, and has a reaction potential higher than the reaction potential of the covering portion, and
   the first covering portion partially covers the ion supply source, maintains the ion supply source and the electrolyte in the non-contact state, and is dissolved at the reaction potential.

4. The nonaqueous secondary battery according to claim 1,
   wherein the ion supply unit includes
   a conductive portion which electrically connects the ion supply source and the positive electrode by being interposed between the ion supply source and the electrolyte, and has a reaction potential higher than the reaction potential of the first covering portion, and
   a second covering portion which partially covers the ion supply source, maintains the ion supply source and the electrolyte in the non-contact state, and has a reaction potential higher than the reaction potential of the first covering portion, and
   the first covering portion partially covers the ion supply source, maintains the ion supply source and the electrolyte in the non-contact state, and is dissolved at the reaction potential.

5. The nonaqueous secondary battery according to claim 4,
   wherein a part of the surface of the ion supply source is covered with the first covering portion, and a remaining part of the surface is covered with the conductive portion and the second covering portion.

6. The nonaqueous secondary battery according to claim 5,
   wherein the first covering portion is formed of metal.

7. The nonaqueous secondary battery according to claim 5,
   wherein the ion supply source is metal lithium.

8. The nonaqueous secondary battery according to claim 5,
   wherein the ion supply source includes silicon or tin and lithium.

9. The nonaqueous secondary battery according to claim 5,
   wherein the conductive portion includes aluminum.

10. The nonaqueous secondary battery according to claim 5,
    wherein the second covering portion is formed of a resin.

11. The nonaqueous secondary battery according to claim 1,
    wherein the first covering portion sets the ion supply source and the positive electrode to be in the electrically disconnected state by being interposed between the ion supply source and the positive electrode, and is electrolyzed and disappears at the reaction potential.

12. The nonaqueous secondary battery according to claim 11,
    wherein the positive electrode is formed by applying an oxide including lithium as a positive electrode active material to both surfaces of a positive electrode foil which is a collector,
    the negative electrode is formed by applying a carbon-based material as a negative electrode active material to both surfaces of a negative electrode foil which is a collector,
    the electrolyte is an organic electrolytic solution in which a salt including lithium is dissolved, and
    the ion supply source is a material including lithium.

13. The nonaqueous secondary battery according to claim 12,
    wherein the positive electrode includes a positive electrode active material denoted by a chemical formula of $LiMPO_4$ (M includes at least Fe, Mn, Co, and Ni).

14. A battery control system using the nonaqueous secondary battery according to claim 13,
    wherein the nonaqueous secondary battery is controlled such that the nonaqueous secondary battery is in an overcharged state by using degradation in battery capacitance of the nonaqueous secondary battery as a trigger, and an ion supply unit is operated.

* * * * *